United States Patent
Shpunt et al.

(10) Patent No.: US 9,784,838 B1
(45) Date of Patent: Oct. 10, 2017

(54) COMPACT SCANNER WITH GIMBALED OPTICS

(71) Applicant: Apple Inc., Cupertino, CA (US)

(72) Inventors: Alexander Shpunt, Tel Aviv (IL); Noel Axelrod, Jerusalem (IL); Raviv Erlich, Rehovot (IL); Yuval Gerson, Tel-Mond (IL)

(73) Assignee: APPLE INC., Cupertino, CA (US)

( * ) Notice: Subject to any disclaimer, the term of this patent is extended or adjusted under 35 U.S.C. 154(b) by 382 days.

(21) Appl. No.: 14/554,086

(22) Filed: Nov. 26, 2014

(51) Int. Cl.
*G01S 17/89* (2006.01)
*G02B 26/10* (2006.01)
*G02B 26/08* (2006.01)
*G01S 17/08* (2006.01)

(52) U.S. Cl.
CPC .............. *G01S 17/89* (2013.01); *G01S 17/08* (2013.01); *G02B 26/085* (2013.01); *G02B 26/105* (2013.01)

(58) Field of Classification Search
CPC ........ G01S 17/89; G01S 17/10; G01S 7/4817; G01S 17/42; G02B 26/085; G02B 26/101; G02B 26/105; H01L 21/50
See application file for complete search history.

(56) References Cited

U.S. PATENT DOCUMENTS

| | | |
|---|---|---|
| 3,918,068 A | 11/1975 | Reinke et al. |
| 4,003,626 A | 1/1977 | Reinke et al. |
| 5,629,790 A | 5/1997 | Neukermans et al. |
| 5,742,419 A | 4/1998 | Dickensheets et al. |
| 5,847,859 A | 12/1998 | Murata |
| 5,938,989 A | 8/1999 | Hambright |
| 6,140,979 A | 10/2000 | Gerhard et al. |
| 6,517,751 B1 | 2/2003 | Hambright |
| 6,603,894 B1 | 8/2003 | Pu |
| 6,753,638 B2 | 6/2004 | Adams et al. |
| 6,825,967 B1 | 11/2004 | Chong et al. |

(Continued)

FOREIGN PATENT DOCUMENTS

| | | |
|---|---|---|
| CN | 1621322 | 6/2005 |
| CN | 101308343 A | 11/2008 |

(Continued)

OTHER PUBLICATIONS

Gruger et al., "New approach for MEMS scanning mirror for laser projection systems", SPIE Proceedings, vol. 6887, MOEMS and Miniaturized Systems VII, pp. 68870L-68870L, Feb. 8, 2008.

(Continued)

*Primary Examiner* — Luke Ratcliffe
(74) *Attorney, Agent, or Firm* — D.Kligler IP Services Ltd.

(57) ABSTRACT

A scanning device includes a scanner, which includes a base and a gimbal, mounted within the base so as to rotate relative to the base about a first axis. A receive mirror is mounted within the gimbal so as to rotate about a second axis, perpendicular to the first axis. A detector is mounted on the gimbal so as to rotate with the gimbal about the first axis and receive light reflected from the receive mirror while the receive mirror rotates about the second axis. A collection lens is mounted on the gimbal so as to rotate with the gimbal about the first axis while collecting the light so as to focus the light onto the detector by reflection from the receive mirror while the receive mirror rotates about the second axis.

17 Claims, 6 Drawing Sheets

(56) References Cited

U.S. PATENT DOCUMENTS

| | | | |
|---|---|---|---|
| 6,882,770 | B2 | 4/2005 | Neilson et al. |
| 6,941,034 | B2 | 9/2005 | Kuboi |
| 7,609,875 | B2 | 10/2009 | Liu et al. |
| 7,952,781 | B2 | 5/2011 | Weiss et al. |
| 8,018,579 | B1 | 9/2011 | Krah |
| 8,437,063 | B2 | 5/2013 | Weiss et al. |
| 8,624,177 | B2 | 1/2014 | Campion et al. |
| 8,752,969 | B1 | 6/2014 | Kane et al. |
| 8,797,623 | B2 | 8/2014 | Weiss et al. |
| 2002/0070335 | A1 | 6/2002 | Orcutt et al. |
| 2002/0071169 | A1 | 6/2002 | Bowers et al. |
| 2002/0075786 | A1 | 6/2002 | Ikegame |
| 2003/0137711 | A1 | 7/2003 | Yagi et al. |
| 2003/0162313 | A1 | 8/2003 | Kim et al. |
| 2004/0004775 | A1 | 1/2004 | Turner |
| 2004/0021852 | A1 | 2/2004 | DeFlumere |
| 2004/0036936 | A1 | 2/2004 | Nakajima et al. |
| 2004/0040648 | A1 | 3/2004 | Harden et al. |
| 2004/0063235 | A1 | 4/2004 | Chang |
| 2004/0070816 | A1 | 4/2004 | Kato et al. |
| 2004/0081391 | A1 | 4/2004 | Ko et al. |
| 2004/0105139 | A1 | 6/2004 | Hirose et al. |
| 2004/0207744 | A1 | 10/2004 | Bock |
| 2004/0214350 | A1 | 10/2004 | Pan et al. |
| 2005/0157363 | A1 | 7/2005 | Orcutt |
| 2007/0064293 | A1 | 3/2007 | Turner et al. |
| 2008/0143196 | A1 | 6/2008 | Sprague et al. |
| 2008/0225368 | A1 | 9/2008 | Ciabattoni et al. |
| 2009/0002678 | A1 | 1/2009 | Tanaka et al. |
| 2009/0161177 | A1 | 6/2009 | Nomura |
| 2009/0284817 | A1 | 11/2009 | Orcutt |
| 2009/0294638 | A1 | 12/2009 | Mohanty et al. |
| 2010/0046054 | A1 | 2/2010 | Jeong et al. |
| 2010/0142020 | A1 | 6/2010 | Kim |
| 2010/0182667 | A1 | 7/2010 | Ishida |
| 2010/0253989 | A1 | 10/2010 | Shimizu et al. |
| 2010/0302617 | A1 | 12/2010 | Zhou |
| 2011/0188054 | A1 | 8/2011 | Petronius et al. |
| 2011/0205456 | A1 | 8/2011 | Mizoguchi et al. |
| 2011/0205609 | A1 | 8/2011 | Mizoguchi |
| 2011/0228251 | A1 | 9/2011 | Yee et al. |
| 2011/0228367 | A1 | 9/2011 | Lubianiker et al. |
| 2011/0279648 | A1 | 11/2011 | Lutian et al. |
| 2011/0310125 | A1 | 12/2011 | McEldowney et al. |
| 2012/0236379 | A1 | 9/2012 | Dasilva et al. |
| 2012/0250124 | A1 | 10/2012 | Choi et al. |
| 2012/0307211 | A1 | 12/2012 | Hofmann et al. |
| 2013/0206967 | A1 | 8/2013 | Shpunt et al. |
| 2013/0207970 | A1 | 8/2013 | Shpunt et al. |
| 2013/0301101 | A1 | 11/2013 | Conrad et al. |
| 2014/0153001 | A1* | 6/2014 | Chayat ............... G01S 17/89 356/612 |
| 2014/0226145 | A1* | 8/2014 | Steffey ............... G01C 15/002 356/4.01 |
| 2014/0291491 | A1 | 10/2014 | Shpunt et al. |
| 2014/0291496 | A1 | 10/2014 | Shpunt et al. |
| 2014/0310914 | A1 | 10/2014 | Erlich et al. |
| 2014/0313519 | A1 | 10/2014 | Shpunt et al. |
| 2016/0178895 | A1 | 6/2016 | Gerson et al. |

FOREIGN PATENT DOCUMENTS

| | | | |
|---|---|---|---|
| DE | 102011113147 | B3 | 1/2013 |
| EP | 1411024 | A2 | 4/2004 |
| EP | 1450198 | A2 | 8/2004 |
| EP | 1548487 | A1 | 6/2005 |
| EP | 2333603 | A1 | 6/2011 |
| EP | 2363686 | A1 | 9/2011 |
| GB | 2271436 | A | 4/1994 |
| JP | 2004191918 | A | 7/2004 |
| KR | 100867147 | B1 | 11/2008 |
| WO | 02/47241 | A | 6/2002 |
| WO | 03/049156 | A2 | 6/2003 |
| WO | 2005078509 | A2 | 8/2005 |
| WO | 2009107922 | A1 | 9/2009 |
| WO | 2012/020380 | A1 | 2/2012 |
| WO | 2012013536 | A1 | 2/2012 |
| WO | 2014016794 | A1 | 1/2014 |
| WO | 2014064606 | A1 | 5/2014 |

OTHER PUBLICATIONS

International Application # PCT/US2015/67974 Search Report dated May 3, 2016.

Yang et al., "Phase synchronization of micro-mirror arrays using elastic linkages", Sensors and Actuators A, Elsevier Sequoia, vol. 95, No. 1, pp. 55-60, Dec. 15, 2001.

European Application # 13764401.9 Search Report dated Mar. 6, 2015.

Judy et al., "Magnetic Microactuation of Polysilicon Flexure Structures," Solid-State Sensor and Actuator Workshop, year 1994.

Judy et al., "Magnetically Actuated, Addressable Microstructures," Journal of Microelectromechanical Systems, vol. 6, No. 3, pp. 249-256, Sep. 1997.

Cho et al., "A Scanning Micromirror Using a Bi-Directionally Movable Magnetic Microactuator," Proceedings of SPIE, MOEMS and Miniaturized Systems, vol. 4178, pp. 106-115, USA 2000.

Hamamatsu Photonics K.K., "Position sensitive detectors", Japan, Feb. 2010.

Gale, M.T., "Replication Technology for Diffractive Optical Elements", Proceedings of SPIE, vol. 3010, pp. 111-123, May 15, 1997.

Kolste et al., "Injection Molding for Diffractive Optics", Proceedings of SPIE, vol. 2404, pp. 129-131, Feb. 9, 1995.

Gale et al., "Replicated Microstructures for Integrated Topics", Proceedings of SPIE, vol. 2513, pp. 2-10, Aug. 29, 1994.

Jahns et al., "Diffractive Optics and Micro-Optics: Introduction to the Feature Issue", Applied Optics Journal, vol. 36, No. 20, pp. 4633-4634, Jul. 10, 1997.

Nikolejeff et al., "Replication of Continuous Relief Diffractive Optical Elements by Conventional Compact Disc Injection-Molding Techniques", Applied Optics Journal, vol. 36, No. 20, pp. 4655-4659, Jul. 10, 1997.

Neyer et al., "New Fabrication Technology for Polymer Optical Waveguides", Integrated Photonics Research, pp. 248-249, year 1992.

Neyer et al., "Fabrication of Low Loss Polymer Waveguides Using Injection Moulding Technology", Electronics Letters, vol. 29, No. 4, pp. 399-401, Feb. 18, 1993.

Optical Society of America, "Diffractive Optics and Micro-Optics", 1996 Technical Digest Series, vol. 5, Boston, USA, Apr. 29-May 2, 1996.

Lintec Corporation, "Adwill D-510T Tape", Japan, Apr. 4, 2006.

Stark, B., "MEMS Reliability Assurance Guidelines for Space Applications", Jet Propulsion Laboratory, California Institute of Technology, Pasadena, USA, Jan. 1999.

Fraunhofer Institute for Photonic Microsystems, "Lamda—Large Aperture MEMS Scanner Module for 3D Distance Measurement"—Data sheet, Dresden, Germany, 2 pages, May 9, 2012.

International Application # PCT/IB2013/056101 Search Report Dated Dec. 17, 2013.

Fujita et al., "Dual-Axis MEMS Mirror for Large Deflection-Angle Using SU-8 Soft Torsion Beam," Sensors and Actuators A: Physical, vol. 121, issue 1, pp. 16-21, May 2005.

Stone et al., "Performance Analysis of Next-Generation LADAR for Manufacturing, Construction, and Mobility", National Institute of Standards and Technology, document # NISTIR 7117, Gaithersburg, USA, May 2004.

U.S. Appl. No. 13/798,251 Office Action dated Nov. 20, 2014.

International Application PCT/IB2013/051985 Search Report dated Jul. 22, 2013.

International Application PCT/IB2013/051189 Search Report Dated Jun. 18, 2013.

Minifaros, "D1.1-ProjectPresentation", V3.0, 36 pages, Dec. 22, 2010.

Shpunt, A., U.S. Appl. No. 14/551,113, filed Nov. 24, 2014.

Gerson et al., U.S. Appl. No. 14/599,507, filed Nov. 18, 2014.

(56) References Cited

OTHER PUBLICATIONS

Shpunt et al., U.S. Appl. No. 14/551,104, filed Nov. 24, 2014.
Shpunt et al., U.S. Appl. No. 14/554,078, filed Nov. 26, 2014.
Niclass et al., "Design and characterization of a 256×64-pixel single-photon imager in CMOS for a MEMS based laser scanning time-of-flight sensor", Optics Express, vol. 20, No. 11, pp. 11863-11881, May 21, 2012.
Hah et al., "Theory and Experiments of Angular Vertical Comb-Drive Actuators for Scanning Micromirrors", IEEE Journal of Selected Topics in Quantum Electronics, vol. 10, No. 3, pp. 505-513, May/Jun. 2004.
Sandenr et al., "Large Aperture MEMS Segmented Scanner Module for LIDAR Systems", SPAR Conference—Europe, Amsterdam, 48 pages, Dec. 8, 2010.
International Application # PCT/US15/56297 Search Report dated Jan. 19, 2016.
Sandner et al., "3D imaging using resonant large-aperture MEMS mirror arrays and laser distance measurement", IEEE/LEOS International Conference on Optical MEMs and Nanophotonics, pp. 78-79, Aug. 11, 2008.
CN Application # 201380015506.3 Office Action dated Mar. 31, 2016.
CN Application # 201380015506.3 Office Action dated Aug. 16, 2016.
U.S. Appl. No. 14/599,507 Office Action dated Oct. 20, 2016.
U.S. Appl. No. 14/551,104 Office Action dated Nov. 1, 2016.
International Application # PCT/US2016/45452 Search Report dated Oct. 28, 2016.
Sandner et al., "Synchronized microscanner array for large aperture receiver optics of LIDAR systems", Proceedings of SPIE—The International Society for Optical Engineering, vol. 7594, 12 pages, Feb. 17, 2010.
International Application # PCT/US15/11883 Search Report dated Jul. 21, 2015.
U.S. Appl. No. 13/798,251 Office Action dated Jul. 13, 2015.
U.S. Appl. No. 14/975,871 Office Action dated Jan. 13, 2017.
U.S. Appl. No. 14/599,507 Office Action dated Mar. 8, 2017.
U.S. Appl. No. 14/554,078 Office Action dated May 31, 2017.

* cited by examiner

COMPACT SCANNER WITH GIMBALED OPTICS

FIELD OF THE INVENTION

The present invention relates generally to methods and devices for projection and capture of optical radiation, and particularly to compact optical scanners.

BACKGROUND

Various methods are known in the art for optical 3D mapping, i.e., generating a 3D profile of the surface of an object by processing an optical image of the object. This sort of 3D profile is also referred to as a 3D map, depth map or depth image, and 3D mapping is also referred to as depth mapping.

Some methods of 3D mapping use time-of-flight sensing. For example, U.S. Patent Application Publication 2013/0207970, whose disclosure is incorporated herein by reference, describes a scanning depth engine, which includes a transmitter, which emits a beam comprising pulses of light, and a scanner, which is configured to scan the beam, within a predefined scan range, over a scene. The scanner may comprise a micromirror produced using microelectromechanical system (MEMS) technology. A receiver receives the light reflected from the scene and generates an output indicative of the time of flight of the pulses to and from points in the scene. A processor is coupled to control the scanner and to process the output of the receiver so as to generate a 3D map of the scene.

Another example of a time-of-flight scanner using MEMS technology is the Lamda scanner module produced by the Fraunhofer Institute for Photonic Microsystems IPMS (Dresden, Germany). The Lamda module is constructed based on a segmented MEMS scanner device consisting of identical scanning mirror elements. A single scanning mirror of the collimated transmit beam oscillates parallel to a segmented scanning mirror device of the receiver optics.

PCT International Publication WO 2014/016794, whose disclosure is incorporated herein by reference, describes optical scanners with enhanced performance and capabilities. In a disclosed embodiment, optical apparatus includes a stator assembly, which includes a core containing an air gap and one or more coils including conductive wire wound on the core so as to cause the core to form a magnetic circuit through the air gap in response to an electrical current flowing in the conductive wire. A scanning mirror assembly includes a support structure, a base, which is mounted to rotate about a first axis relative to the support structure, and a mirror, which is mounted to rotate about a second axis relative to the base. At least one rotor includes one or more permanent magnets, which are fixed to the scanning mirror assembly and which are positioned in the air gap so as to move in response to the magnetic circuit. A driver is coupled to generate the electrical current in the one or more coils at one or more frequencies selected so that motion of the at least one rotor, in response to the magnetic circuit, causes the base to rotate about the first axis at a first frequency while causing the mirror to rotate about the second axis at a second frequency.

U.S. Patent Application Publication 2014/0153001, whose disclosure is incorporated herein by reference, describes an optical scanning device that includes a substrate, which is etched to define an array of two or more parallel micromirrors and a support surrounding the micromirrors. Respective spindles connect the micromirrors to the support, thereby defining respective parallel axes of rotation of the micromirrors relative to the support. One or more flexible coupling members are connected to the micromirrors so as to synchronize an oscillation of the micromirrors about the respective axes.

U.S. Pat. No. 7,952,781, whose disclosure is incorporated herein by reference, describes a method of scanning a light beam and a method of manufacturing a microelectromechanical system (MEMS), which can be incorporated in a scanning device. In a disclosed embodiment, a rotor assembly having at least one micromirror is formed with a permanent magnetic material mounted thereon, and a stator assembly has an arrangement of coils for applying a predetermined moment on the at least one micromirror.

SUMMARY

Embodiments of the present invention provide improved devices and methods for efficient scanning.

There is therefore provided, in accordance with an embodiment of the present invention, a scanning device, including a scanner, which includes a base and a gimbal, mounted within the base so as to rotate relative to the base about a first axis. A receive mirror is mounted within the gimbal so as to rotate about a second axis, perpendicular to the first axis. A detector is mounted on the gimbal so as to rotate with the gimbal about the first axis and receive light reflected from the receive mirror while the receive mirror rotates about the second axis. A collection lens is mounted on the gimbal so as to rotate with the gimbal about the first axis while collecting the light so as to focus the light onto the detector by reflection from the receive mirror while the receive mirror rotates about the second axis.

In a disclosed embodiment, the scanner includes a substrate, which is etched to define the base, the gimbal, and the receive mirror in a microelectromechanical systems (MEMS) process.

In some embodiments, the device includes a detector mount, which holds the detector in a position between the collection lens and the receive mirror at a focal point of the collection lens. In a disclosed embodiment, the collection lens focuses the light onto the detector with a numerical aperture greater than 0.5. Additionally or alternatively, the collection lens has a first area, and the receive mirror has a second area, which is less than half the first area. Typically, the collection lens focuses the collected light at a predefined focal distance, and is mounted at a distance from the receive mirror that is half the focal distance.

In some embodiments, the device includes a stator, which is configured to generate a time-varying magnetic field, and one or more rotors, which are fixed to the gimbal so as to cause the gimbal to rotate in response to the time-varying magnetic field. A frame is fixed to the rotor and holds the detector and the collection lens.

In the disclosed embodiments, the scanner includes a transmit mirror, which mounted within the gimbal so as to rotate about a third axis, parallel to the second axis, in synchronization with the receive mirror. The device includes a transmitter, which is mounted on the gimbal so as to rotate with the gimbal about the first axis and to transmit a beam of light toward the transmit mirror while the transmit mirror rotates about the third axis so as to scan the beam of light over a scene, whereby the detector receives, via the collection lens and the receive mirror, the light that is reflected from the scene. In one embodiment, the beam emitted by the transmitter includes pulses of light, and the detector is configured to generate an output, in response to the received light, that is indicative of a time of flight of the pulses to and from points in the scene.

In a disclosed embodiment, the transmit mirror has a first area, and the receive mirror has a second area, which is at least twice the first area. Rotations of the transmit and receive mirrors are synchronized in frequency and phase, while the transmit and receive mirrors rotate with different amplitudes.

In some embodiments, the transmitter includes an emitter, which is configured to emit the beam of light in a direction parallel to the gimbal, and the device includes a turning mirror, which is mounted off-axis relative to the first axis and is configured to receive and direct the emitted beam toward the transmit mirror, and the detector is also mounted off-axis relative to the first axis.

There is also provided, in accordance with an embodiment of the present invention, a method for scanning, which includes mounting a gimbal within a base so as to rotate relative to the base about a first axis. A receive mirror is mounted within the gimbal so as to rotate about a second axis, perpendicular to the first axis. A detector is mounted on the gimbal so as to rotate with the gimbal about the first axis and receive light reflected from the receive mirror while the receive mirror rotates about the second axis. The light is collected using a collection lens mounted on the gimbal so as to rotate with the gimbal about the first axis so as to focus the light onto the detector by reflection from the receive mirror while the receive mirror rotates about the second axis.

The present invention will be more fully understood from the following detailed description of the embodiments thereof, taken together with the drawings in which:

DETAILED DESCRIPTION OF EMBODIMENTS

Overview

Scanning optical devices often face a tradeoff between angular scan range, size and precision. For example, in the sort of MEMS-based time-of-flight (ToF) optical scanners that are described above in the Background section, the precision of depth measurement is limited by the strength of the received optical signal. This signal, in turn, is a function of the size of the receive aperture of the scanner, which is determined by the size of the collection optics and scanning mirror that collect light reflected from the scanned scene and direct it onto the receiver (typically a high-speed photodetector). Thus, enlarging the collection lens and mirror will improve the signal/noise ratio for 3D mapping, but at the same time, of course, will increase the size of the device and, for a device of a given size, can limit the angular range over which it is able to scan.

Some embodiments of the present invention that are described herein address this problem with a compact scanner design, in which the collection optics and receiver are mounted on the same rotating gimbal as the scanning receive mirror. Consequently, the optics and receiver rotate about the gimbal axis together with the mirror, giving a larger effective aperture than scanners of comparable size in which the optics and receiver are stationary. In the disclosed embodiments, the scanner typically also comprises a beam transmitter (such as a laser diode with collimating optics) and a scanning transmit mirror, which are likewise mounted on the same gimbal as the collection optics, receive mirror and receiver.

Specifically, in these embodiments, a scanning device comprises a scanner, in which a gimbal is mounted within a base so as to rotate relative to the base about the gimbal axis, and a receive mirror is mounted within the gimbal so as to rotate about a mirror axis, perpendicular to the gimbal axis. A detector is mounted on the gimbal so as to rotate with the gimbal about the gimbal axis and receive light reflected from the receive mirror while the receive mirror rotates about the mirror axis. A collection lens is also mounted on the gimbal and likewise rotates with the gimbal while collecting the light, so as to focus the light onto the detector by reflection from the receive mirror while the receive mirror rotates about the mirror axis. The area from which the detector receives light is thus scanned over an area of interest by the combined rotations of the gimbal and the receive mirror.

This sort of gimbaled scanning device is particularly useful in the context of ToF sensing systems, as described above, but may alternatively be applied in other sorts of scanned receivers. The principles of the present invention can be used, for example, in other systems that involve scanned reception of radiation, including optical, radio-frequency, and ultrasonic radiation, in which media or objects are detected by means of reflected or otherwise scattered radiation, using spatially separated emitters and detectors, wherein a first scanned element (such as a mirror) directs emitted radiation onto the object while a second scanned element directs collected radiation onto the receiver.

In embodiments in which the scanning device also includes a transmitter, the scanner typically comprises a transmit mirror, which mounted within the gimbal so as to rotate about its own mirror axis, parallel to the axis of the receive mirror, in synchronization with the receive mirror. The transmitter is mounted on the gimbal so as to rotate with the gimbal about the gimbal axis and to transmit a beam of light toward the transmit mirror while the transmit mirror rotates about its mirror axis so as to scan the beam of light over a scene. The detector thus receives, via the collection lens and the receive mirror, the light that is reflected from each point in the scene that is illuminated by the transmitted beam.

When separate transmit and receive mirrors are used in this fashion, the rotations of the transmit and receive mirrors are synchronized in frequency and phase but may rotate with different amplitudes, depending on the optical configuration of the scanning device. Since the transmitted beam is collimated, it is generally unnecessary that the transmit mirror have an aperture that is as large as the receive mirror. On the other hand, reducing the size of the transmit mirror relative to the receive mirror can reduce the overall size and enhance the design flexibility of the scanning device.

Thus, in some embodiments of the present invention, in which transmit and receive mirrors are mounted to rotate together in synchronization in a gimbal, the area of the receive mirror is at least twice the area of the transmit mirror, and may be at least four times the area of the transmit mirror. Despite the differences in the sizes of the mirrors, the hinges connecting the transmit and receive mirrors to the gimbal may be configured so that the mirrors, considered in isolation from one another, have respective resonant frequencies of rotation about their hinges that are approximately equal, for example, within 10% of one another.

More precisely, the transmit and receive mirrors are coupled together so as to synchronize the frequency and phase of the oscillation, using a mechanical coupler of the sort described in the above-mentioned U.S. Patent Application Publication 2014/0153001, or other suitable means of coupling. In this configuration, the mirrors have common symmetrical and anti-symmetrical modes of oscillation, with respective eigenfrequencies, as explained further in the Appendix hereinbelow. (These system eigenfrequencies are in general different from the individual resonance frequencies referred to above.) To achieve the desired performance, the gimbal in the disclosed embodiments includes mechanical coupling elements that are designed to give the appropriate strength of coupling and quality factors of the oscillations. As noted earlier, the amplitudes of oscillation of the two mirrors may differ, depending on application requirements.

Although the transmit and receive mirrors are used in the embodiments described below for purposes of ToF depth mapping, gimbaled arrays of synchronized mirrors of different sizes may likewise be used in other applications, particularly in miniaturized, MEMS-based systems. These alternative applications are also considered to be within the scope of the present invention.

For example, an ultrasonic scanner for 3D mapping typically comprises a source of acoustic radiation (ultrasonic transducer), a detector (such as another transducer), and optics (such as an acoustic lens). The interrogated media in this case may be, for example, physiological tissues, with imaging contrast due to the difference in acoustic impedance between the different parts of the tissue. The same sort of imaging scanner described above could be used, mutatis mutandis, for 3D mapping of scattered acoustic waves. In this scanner, the mirrors have surfaces with high acoustic impedance, so that acoustic waves are reflected from the surface, and the second mirror oscillates synchronously with the first mirror. An acoustic lens in front of the second mirror may be mounted on the same gimbal, with the detector mounted in front of the second mirror and behind the lens.

A system of this sort can be very efficient in collecting backscattered acoustic waves from the tissue and can thus provide ultrasound images of better quality than conventional ultrasound systems, in which only a tiny portion of the backscattered radiation is actually collected. Because only a portion of the field of view is actually "seen" by the detector at any given time during the scan—the part of the field of view that receives radiated waves—the receiver effectively selects the reflected waves and filters them from background and multiply-reflected waves. Since the dimensions of the MEMS scanner are tiny (in the range of millimeters) this sort of 3D ultrasound scanner could even be inserted into catheter.

System Description

Figure 1:
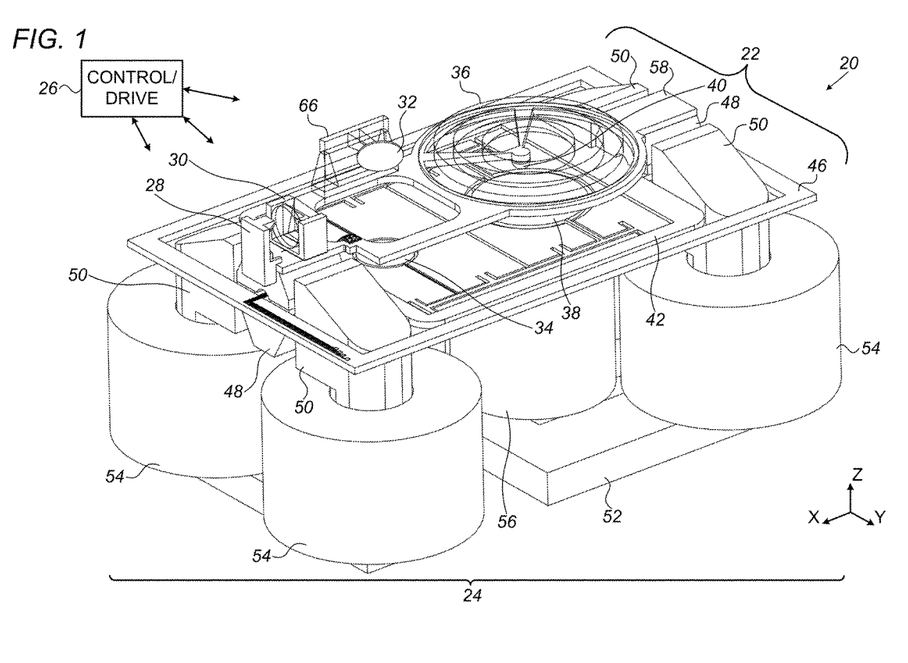
FIG. 1 is a schematic, pictorial illustration of an optical scanning device, in accordance with an embodiment of the present invention.
Figure 2:
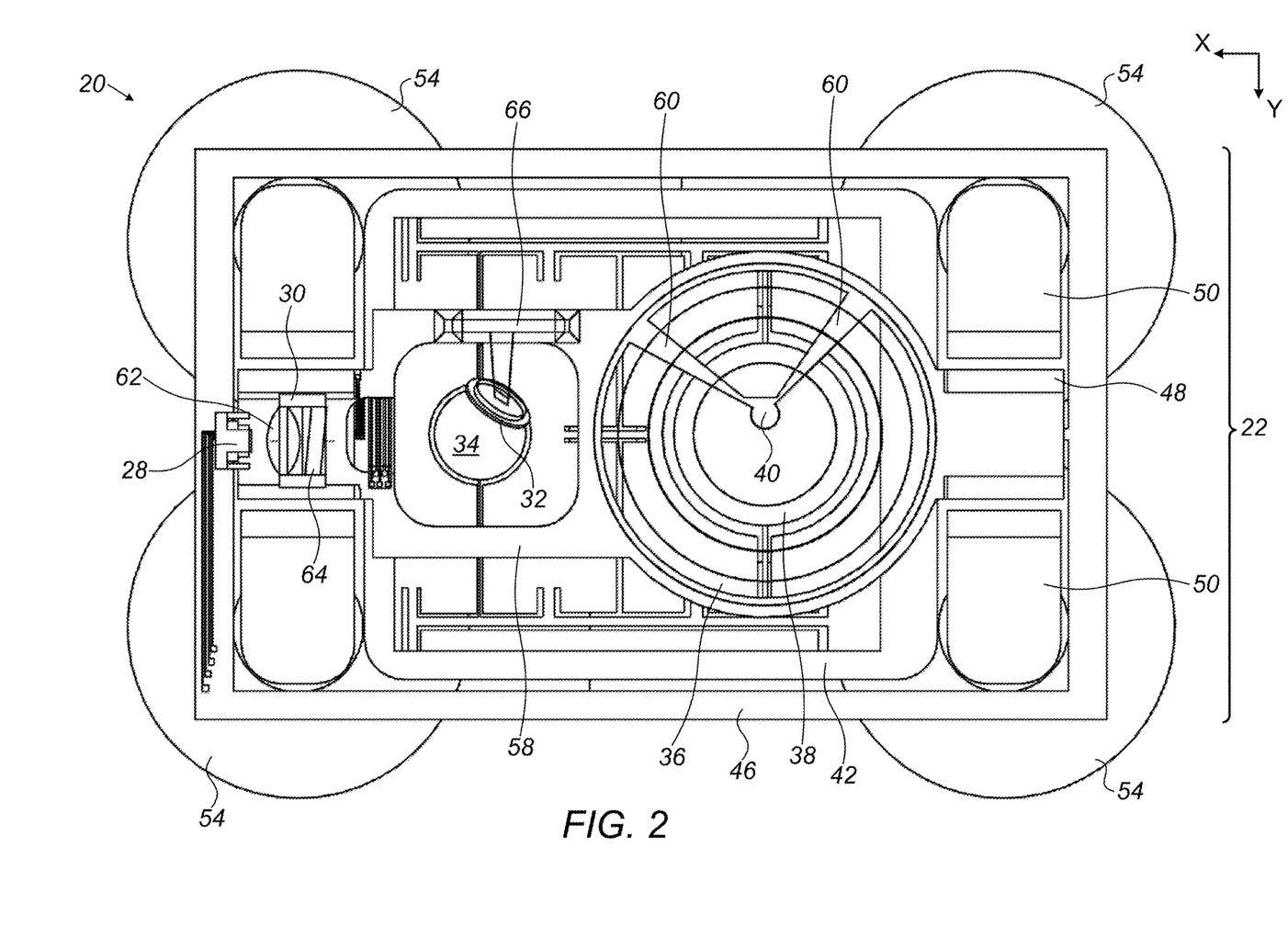
FIGS. 2 and 3 are schematic top and side views, respectively, of the optical scanning device of FIG. 1, in accordance with an embodiment of the present invention.
Figure 3:
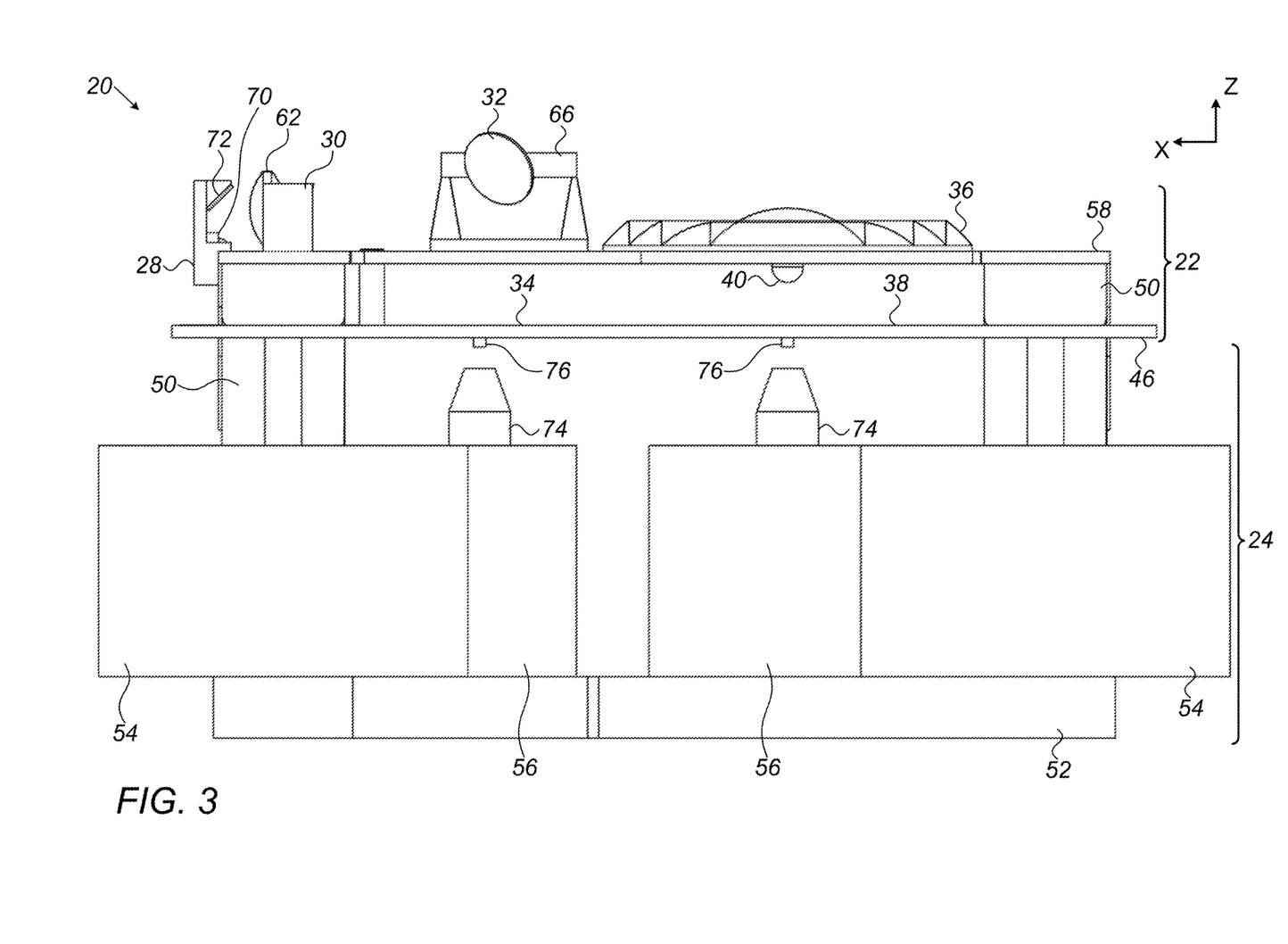
Figure 4:
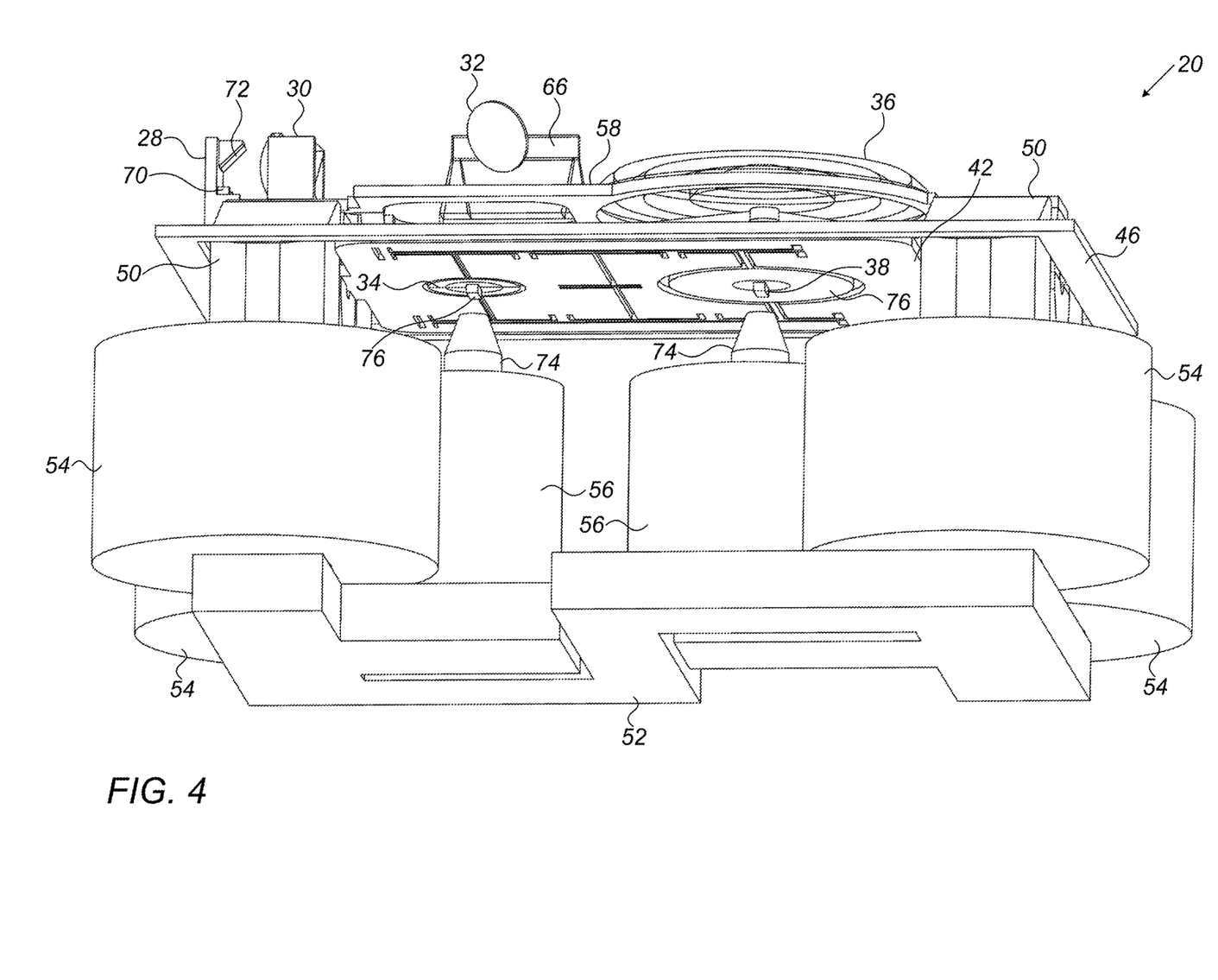
FIG. 4 is a schematic, pictorial illustration of the optical scanning device of FIG. 1 from another perspective, in accordance with an embodiment of the present invention.

Reference is now made to FIGS. 1-4, which schematically illustrate an optical scanning device 20, in accordance with an embodiment of the present invention. FIG. 1 presents a pictorial overview of device 20, while FIGS. 2 and 3 are top and side views, respectively, and FIG. 4 is a pictorial view of the device as seen from below. (Terms referring to orientation in the present description, such as "upward," "above" and "below," are used solely for the sake of convenience, in reference to the viewing perspective shown in the figures, as are the X, Y and Z axes identified in the figures. The positive Z-direction is arbitrarily taken, in this context, to be the upward direction. In practice, device 20 may operate in substantially any orientation.)

Device 20 can be particularly useful as a part of a ToF 3D mapping system or other depth-sensing (LIDAR) device, in conjunction with suitable control and drive circuits 26, as are known in the art. (Details of circuits 26 are omitted from the figures, however, for the sake of simplicity.) Alternatively, device 20 may be adapted for use as a scanning optical transceiver in other applications.

Scanning device 20 is built around a scanner 22, which is driven by a stator 24 under the control of circuits 26. In the embodiment that is shown in the figures, stator 24 drives the moving elements of scanner 22 by means of a varying magnetic field, in a manner similar to the apparatus described in the above-mentioned PCT International Publication WO 2014/016794. Alternatively, scanner 22 may be driven, mutatis mutandis, by magnetic drives of other sorts or by electrostatic or other types of mechanisms, as are known in the art.

A transmitter 28, mounted on scanner 22, emits a beam comprising pulses of light, which are collimated and steered by transmission optics 30 and then directed by a turning mirror 32 toward a transmit mirror 34. (The term "light," in the context of the present description and in the claims, refers to optical radiation of any wavelength, including visible, infrared, and ultraviolet radiation.) Mirror 34 scans the transmitted beam over a scene within a predefined angular range, as determined by the scan limits of the mirror. To open a clear beam path from transmit mirror 34 to the scene, turning mirror 32 is held slightly off axis (relative to the X-axis) by a mount 66.

As shown in FIGS. 2 and 3, transmitter 28 comprises a miniature emitter 70, such as a pulsed laser diode, which emits the beam in the upward (Z) direction, followed by a reflector 72, which turns the beam in a direction parallel to the X-Y plane into transmission optics 30. These transmission optics comprise a collimating lens 62 and a prism 64, which directs the beam from transmitter 28 toward off-axis turning mirror 32.

Light reflected from the scene is collected by a collection lens 36, which focuses the collected light via a receive mirror 38 onto a detector 40, which serves as the receiver. Detector 40 typically comprises a high-speed optoelectronic sensor, such as an avalanche photodiode. (Alternatively, any other suitable sorts of emitting and sensing components may be used as the transmitter and receiver in device 20.) For the sake of compactness and light weight, collection lens 36 may be a Fresnel lens, as shown in the figures. Alternatively, other sorts of collection optics may be used.

Transmit mirror 34 and receive mirror 38 are mounted together within a gimbal 42 and rotate relative to the gimbal about respective axes that are parallel to the Y-axis shown in the figures. Gimbal 42 is mounted to rotate about the X-axis, perpendicular to the Y-axis, relative to a base 46, which is fixed to stator 24. To drive the rotation of gimbal 42 about the X-axis, a pair of rotors 48, typically comprising permanent magnets, are fixed to opposite ends of the gimbal. Rotors 48 are then positioned within respective air gaps between poles 50 of stator 24, which protrude upward from a base 52 of stator 24. Poles and base 24 (as well as poles 74, described below) comprise magnetic cores, which are wound with electrical windings 54, as described in the above-mentioned PCT International Publication WO 2014/016794. Control and drive circuits 26 drive electrical windings 54 with alternating electrical currents, which cause alternating magnetic fields to be generated between poles 50. These alternating magnetic fields interact with the permanent magnetic fields of rotors 48 and thus cause rotation of the rotors, and hence of gimbal 42, about the X-axis.

To drive the rotation of mirrors 34 and 38 about their respective axes relative to gimbal 42, stator 24 comprises additional, internal poles 74, similarly fixed to base 52 and wound with electrical windings 56. Control and drive circuits 26 drive electrical windings 56 with alternating currents, typically at frequencies substantially higher than those driving windings 54. The driving currents cause poles 74 to generate alternating magnetic fields above their respective tips, which are tapered to concentrate the fields in the area of mirrors 34 and 38. These magnetic fields interact with miniature magnetic rotors 76, comprising permanent magnets, which are mounted on the undersides of mirrors 34 and 38. For strong interaction, the gap between poles 74 and rotors 76 is typically no more than a few hundred micrometers.

The drive frequencies of the currents in windings 56 are typically at or near the resonant frequencies of rotation of mirrors 34 and 38 about their respective axes. Rotation sensors (not shown in the figures), such as capacitive or strain-based sensors, as are known in the art, may be mounted in the vicinity of mirrors 34 and 38 in order to provide feedback to circuits 26 regarding the frequency, phase and amplitude of rotation of the mirrors. Circuits 26 may apply this feedback in adjusting the drive signals to coils 54 and 56 in order to achieve the desired mirror rotation parameters.

An upper frame 58 is mounted above gimbal 42 so as to rotate with the gimbal relative to base 46. The optical and optoelectronic components of transmitter 28 and its associated transmission optics, as well as detector 40 and lens 36, are mounted on frame 58 so as to rotate with gimbal 42. In the particular example shown in the figures, mounting of frame 58 over gimbal 42 is conveniently achieved by fixing frame 58 to rotors 48, which in turn are fixed to gimbal 42. Alternatively, other modes of attachment of the transmitter, detector and associated optics above gimbal 42 will be apparent to those skilled in the art and are considered to be within the scope of the present invention.

A detector mount 60 attached to frame 58 holds detector 40 in a position between collection lens 36 and receive mirror 38, at the focal point of the rays collected by the collection lens. Mount 60 may comprise narrow struts, as shown in FIGS. 1 and 2, in order to minimize interference with the incoming light captured by collection lens 36. Positioning detector 40 and lens 36 in this fashion, with a folded beam path between them, provides a large collection aperture (which may have a numerical aperture greater than 0.5) with low overall height. For this purpose, the area of collection lens 36 is typically at least twice the area of receive mirror 38, and may be even four times the area of the receive mirror. The distance between the collection lens and the receive mirror is roughly half the focal distance of the collection lens. Frame 58 typically comprises a suitable dielectric or semiconductor material, with conductive lines (not shown) deposited on its surface to convey electrical power from circuits 26 to emitter 70 and to convey signals output by detector 40 to circuits 26.

Figure 5:
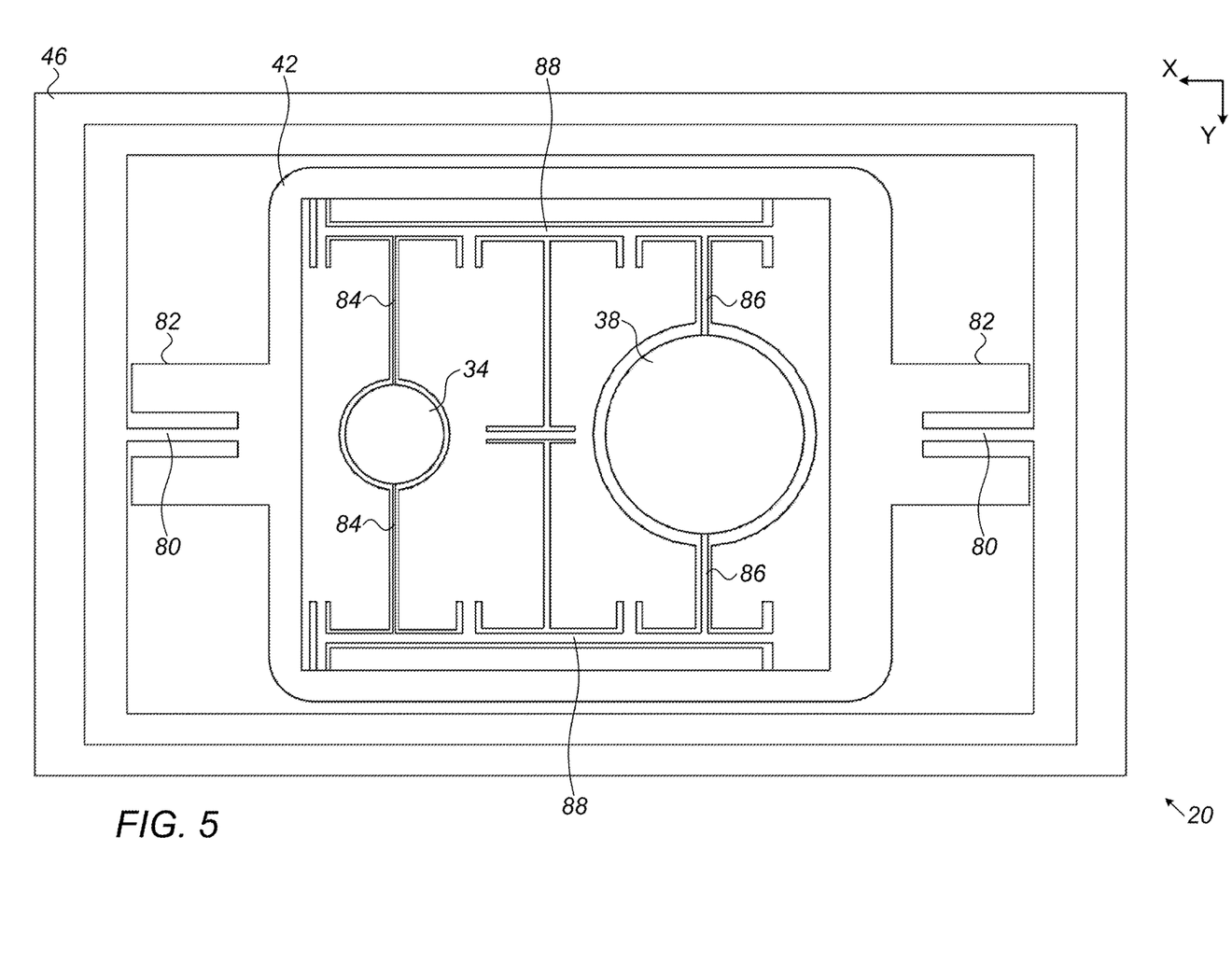
FIG. 5 is a schematic top view of a scanning mirror array, in accordance with an embodiment of the present invention.

FIG. 5 is a schematic top view of the scanning mirror array in device 20, comprising transmit mirror 34 and receive mirror 38, in accordance with an embodiment of the present invention. Mirrors 34 and 38 rotate about respective hinges 84 and 86 relative to gimbal 42, while gimbal 42 rotates about hinges 80 relative to base 46. Hinges 80 of gimbal 42 are contained between wings 82, to which magnetic rotors 48 are fixed, as explained above. Hinges 84 and 86 (and hence the axes of rotation of mirrors 34 and 38) are parallel to one another, along the Y-axis in the figures. Hinges 80 are oriented so that the axis of rotation of gimbal 42, shown as being oriented along the X-axis, is perpendicular to the mirror rotation axes. As noted earlier, scanner 22 may be made from a substrate, such as a semiconductor wafer, which is etched to define base 46, gimbal 42, transmit and receive mirrors 34, 38, and the associated connecting elements in a MEMS process. (A reflective coating is deposited on the mirrors as a part of the process.)

The diameter of receive mirror 38 in the pictured implementation is twice that of transmit mirror 34, meaning that the ratio of areas is 4:1. Typically, for the sake of optical efficiency, the area of the receive mirror is at least twice that of the transmit mirror. Although mirrors 34 and 38 in the pictured example are round, other mirror shapes (maintaining the desired ratio of respective mirror areas) may be used in alternative embodiments. Typically, for portable applications, the respective areas of mirrors 34 and 38 are in the range of 5 to 50 mm$^2$, and the overall area of scanner 22 in the X-Y plane is on the order of 1 cm$^2$. Alternatively, larger or even smaller scanners of this sort may be produced, depending on application requirements.

As noted earlier, mirrors 34 and 38 are driven by stator 24 to rotate at frequencies near their respective resonant frequencies of oscillation about hinges 84 and 86. To compensate for the different dimensions and masses of transmit and receive mirrors 34 and 38, respective hinges 84 and 86 may typically be made with different, respective degrees of stiffness, which are chosen so that the respective resonant frequencies of the two mirrors differ by no more than a predefined tolerance, for example 10%. For this purpose, as illustrated in FIG. 5, hinge 84 is typically considerably thinner, and therefore less stiff, than hinge 86.

Although the actual resonant frequencies may be slightly different, the rotations of transmit mirror 34 and receive mirror 38 are coupled together by coupling belts 88, etched from the silicon substrate, in order to synchronize their oscillations. Furthermore, although the drive signals applied to coils 56 of the respective stators of mirrors 34 and 38 have the same frequency, circuits 26 typically vary the relative amplitudes and possibly the phases of these drive signals in order to overcome the differences in mechanical resistance between the mirrors and provide the desired ratio of rotational amplitudes between the mirror angles. Typically, the coupling provided by belts 88, along with appropriate adjustment of the drive signals provided by circuits 26, synchronizes the rotations of the transmit and receive mirrors in frequency and phase, while the respective amplitudes of rotation may vary, as described further hereinbelow. Feedback from sensors in device may be applied, as noted above, in adjusting the drive signal parameters.

In contrast to the high-frequency, resonant rotations of mirrors 34 and 38, stator 24 typically drives gimbal 42 to rotate relative to base 46 in a non-resonant mode, typically at a frequency substantially lower than the resonant frequency of the mirrors. Rotation of gimbal 42 on hinges 80 causes both of mirrors 34 and 38 to rotate by the same angle about the X-axis (along with transmitter 28, collection lens 36, and detector 40). The fast rotation of mirrors 34 and 38 about the Y-axis and the slower rotation of gimbal 42 about the X-axis may be coordinated so as to define a raster scan of the transmitted and received beams over an area of interest. Alternatively, the rotations of mirrors 34, 38 and gimbal 42 may be controlled to generate scan patterns of other sorts.

Belts 88 are stressed by the torsional forces exerted at the ends of hinges 84 and 86, and thus couple the rotations of mirrors 34 and 38 by means of mechanical forces exerted by the belts on the hinges. Mechanical links of this sort within an array of mirrors are described, for example, in the above-mentioned U.S. Patent Application Publication 2014/0153001. Alternatively or additionally, the mirrors may be coupled together by means of a link exerted by electromagnetic force, which may operate without mechanical contact between the mirrors, as described, for example, in U.S. Provisional Patent Application 61/929,071, filed Jan. 19, 2014, whose disclosure is incorporated herein by reference.

Typically, a weak coupling force is sufficient to engender the desired synchronization between mirrors 34 and 38, particularly when the mirrors are driven to scan at or near their resonant frequencies of rotation. The strength of mechanical coupling can be expressed in terms of a coupling strength coefficient γ, whose derivation is explained in detail in an Appendix below. For the mirror array shown in FIG. 5, for example, the inventors have estimated that γ=1/36 will give good results in synchronizing mirrors 34 and 38, at a resonant frequency of about 4670 Hz.

Figure 6A:
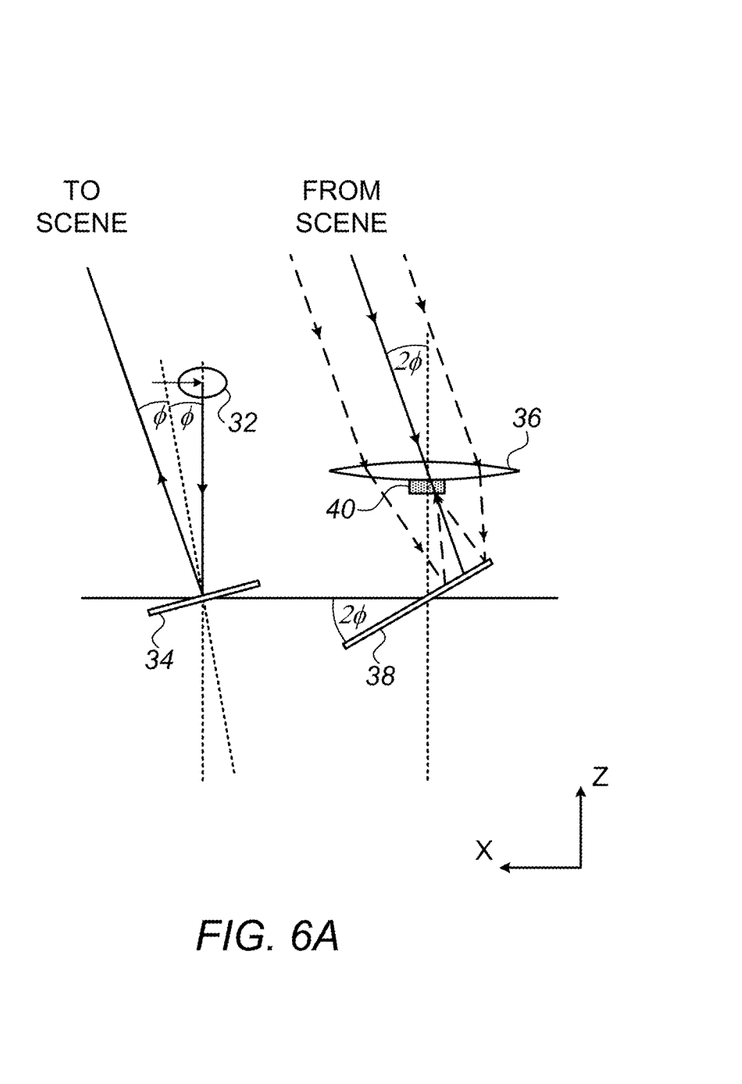
FIGS. 6A and 6B are schematic side views of parts of an optical scanning device, shown in two different, orthogonal planes, in accordance with an embodiment of the present invention.
Figure 6B:
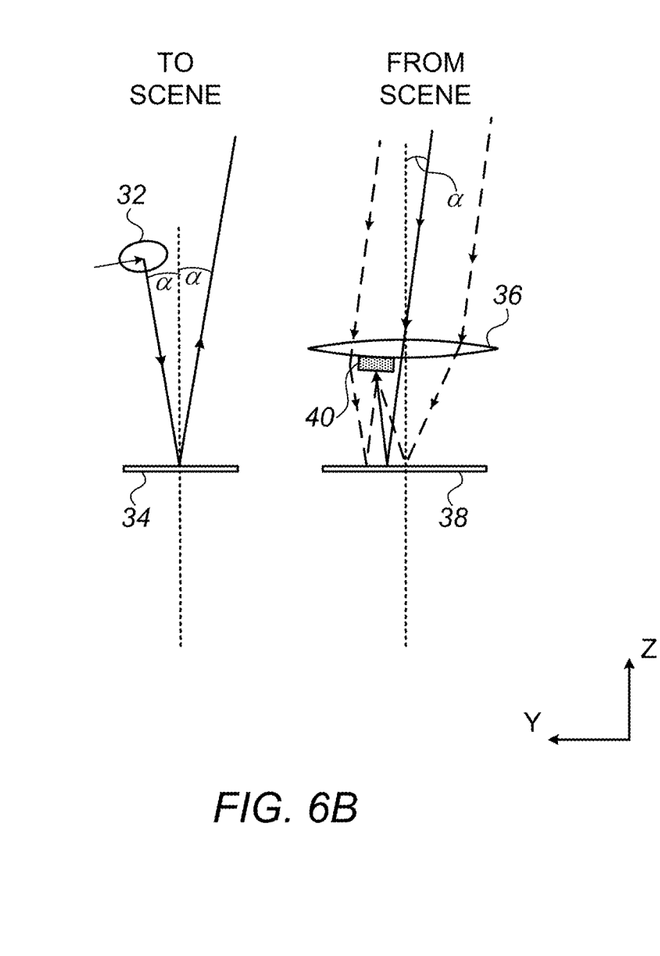

FIGS. 6A and 6B are schematic side views of mirrors 34, 38 and associated optical components, shown in two different, orthogonal planes, in accordance with an embodiment of the present invention. The rotations of mirrors 34 and 38 are controlled and synchronized, as noted above, so that at each point in the scan, detector 40 receives light from the same area of the scene that is illuminated at that point by transmitter 28. FIG. 6A shows the transmitted and received beam paths in the X-Z plane, in which each of mirrors 34 and 38 rotates about its own axis, while FIG. 6B shows the beam paths in the Y-Z plane, in which the mirrors and optical components rotate together on gimbal 42. Although FIG. 6B shows the mirrors at the null point of rotation of the gimbal (with the gimbal parallel to the X-Y plane), the relations among the beam angles shown in FIG. 6B will remain the same regardless of gimbal rotation.

As illustrated particularly in FIGS. 1 and 2, turning mirror 32 and detector 40 are both offset in the X-Y plane relative to the centers of respective mirrors 34 and 38, with an offset angle of α relative to the X-axis. Because the components of the transmitter and receiver rotate together with mirrors 34 and 38 about the X-axis, there is no need for relative rotational adjustment (and no means for providing such adjustment in scanner 22) between the transmit and receive beam paths about the X-axis. Thus, as shown in FIG. 6B, the transmitted and received beams remain in mutual alignment throughout the scan, at the offset angle α relative to the normal of the respective mirrors, as shown in FIG. 6B.

On the other hand, as shown in FIG. 6A, the optical components of the transmitter and receiver do not rotate with mirrors 34 and 38 about the Y-axis. In this case, the relative distances of mirror 32 and detector 40 from the respective mirrors and the optical power of lens 36 create a relative magnification between the transmit and receive paths. In the present example, the magnification is taken to be M=2, although larger or smaller magnification factors may alternatively be used, depending on system design requirements and constraints. As a result of this magnification, when the transmit mirror 34 has rotated, as shown in FIG. 6A, so that the transmitted beam is incident on the transmit at an angle ϕ (measured relative to the normal to the mirror, in the X-Z plane), it is necessary that receive mirror 38 rotate by an angle 2ϕ in order for detector 40 to capture the reflected light from the point in the scene on which the transmitted beam is incident. In other words, although mirrors 34 and 38 rotate with equal frequencies and phases, the amplitude of rotation of mirror is increased relative to that of mirror 34 by the magnification factor M=2.

In formal terms, the vector $\vec{u}$ below gives the direction of the beam incident on transmit mirror 34 in the coordinate system of FIGS. 6A and 6B:

$$\vec{u} = \begin{pmatrix} 0 \\ \sin(\alpha) \\ 0 \end{pmatrix} \quad (1)$$

Vector $\vec{n}$ below gives the direction of the transmitted beam after reflection from transmit mirror 34 in this coordinate system, using the angles α and ϕ as shown in the figures:

$$\vec{n} = \begin{pmatrix} \sin(2\varphi)\cos(\alpha) \\ \sin(\alpha) \\ \cos(2\varphi)\cos(\alpha) \end{pmatrix} \quad (2)$$

The projection of the transmitted beam in the X-Z plane can be written as:

$$\vec{n}_{XZ} = \cos(\alpha) \begin{pmatrix} \sin(2\varphi) \\ \cos(2\varphi) \end{pmatrix} \quad (3)$$

This expression is equivalent to rotation by angle 2ϕ of the beam incident normally on the mirror plane.

The distance to the scene is assumed to be much larger that the distance between the centers of mirrors 34 and 38. The beam reflected from the scene thus returns at the same angle 2ϕ in the X-Z plane relative to the optical axis of the receiver optics (as defined by lens 36, mirror 38 and detector 40). This beam is collected by lens 36, and after reflecting from receive mirror 38 is focused onto detector 40 beneath the lens. The rotation angle of mirror 38 for this purpose is thus 2ϕ, twice the rotation (ϕ) for transmit mirror 34.

In the Y-Z plane, as shown in FIG. 6B, the beam is reflected from mirror 32 and is then incident on transmit mirror 34 at an angle α relative to the Z-axis. The beam is then reflected from mirror 34 by the same angle α, toward the target point in the scene. The reflected beam is likewise incident at angle α in the Y-Z plane relative to the optical axis of the collecting optical system. Lens 36 collects the beam, which then reflects from mirror 38 and is focused onto detector 40, which is positioned slightly off-center in the Y-Z plane. More precisely, the distance between detector 40 and the optical axis is f sin(α), wherein f is the focal length of lens 36. For example, if f=2 mm, and α=10 deg, the off-axis distance in detector position along the Y-axis is about 350 micrometers.

Although the figures described above show a particular optical design and layout of the components of scanning device 20, the principles of the present invention may be applied in scanning devices of other designs. For example, scanner 22 may comprise mirrors and gimbals of different shapes, sizes, orientations and spacing from those shown in the figures, and may further comprise two or more parallel receive mirrors. As another example, transmitter may be positioned to transmit light to mirror 34 directly, without intervening reflector 32. Alternative designs based on the principles set forth above will be apparent to those skilled in the art and are also considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX—SYSTEM OF TWO COUPLED MICRO-MIRRORS

In terms of the mathematical framework for a system of two mechanically-coupled micro-mirrors 34 and 38, we consider a model of two coupled oscillators. In this model, the two oscillators have two separate sources for actuation of vibrations that can be tuned in frequency, amplitude and phase. We will show that if the actuation of the system is done at the frequency corresponding to the symmetric mode of the two oscillators, there exists a solution in parametric space that will cause in-phase oscillation of the two micro-mirrors with any desired amplitude ratio between them.

1. Mathematical Model of Coupled Harmonic Oscillators 1.1 Equations of Motion

The equations of motion of two coupled oscillators are $$\ddot{x}_1 + \frac{\omega_{10}}{Q_1}\dot{x}_1 + \omega_{10}^2 x_1 = F_1 + \lambda_{12} x_2 \tag{1a}$$

$$\ddot{x}_2 + \frac{\omega_{20}}{Q_2}\dot{x}_2 + \omega_{20}^2 x_2 = F_2 + \lambda_{21} x_1 \tag{1b}$$

wherein $\omega_{10}$, $\omega_{20}$ are eigenfrequencies of the first and second oscillators respectively, and $Q_1$, $Q_2$ and $F_1$ and $F_2$ are quality factors and driving forces for the first and second oscillator respectively. The dimensionless quantities $\lambda_{12}$ and $\lambda_{21}$ are coupling constants between the oscillators: $\lambda_{12}$ specifies the strength of the influence of the second oscillator on the first, and vice versa for $\lambda_{21}$.

The meaning of $\gamma_{12}$ and $\gamma_{21}$ can be illustrated by the following example. Suppose the strengths $F_1=0$ and $F_2 \neq 0$ are constant. Then the stationary solution of Eq. (1a) provides:

$$\lambda_{12} = \omega_{10}^2 \frac{x_{10}}{x_{20}} \tag{2a}$$

and vice versa, for the case $F_1 \neq 0$ and $F_2 = 0$, in which the solution of Eq. (1b) is $$\lambda_{21} = \omega_{20}^2 \frac{x'_{20}}{x'_{10}} \tag{2b}$$

Here the tags on $x'_{20}$ and $x'_{20}$ distinguish them from the solution with $x_{10}$ and $x_{20}$ of Eq. (2a) obtained for different initial conditions.

Thus, the meaning of the coupling constants is the following: $\gamma_{12}$ is the ratio between the displacements $x_{10}$ and $x_{20}$ when a constant force is applied to the second oscillator, and $\gamma_{12}$ is the ratio between the displacements of the second and first oscillators when a constant force is applied to the first oscillator.

The mechanical principle of reciprocity requires that $$\lambda_{12} = \lambda_{21} \tag{3}$$

This principle follows from the Lagrangian of a system of two coupled oscillators:

$$L = \frac{1}{2}\dot{x}_1^2 + \frac{1}{2}\dot{x}_1^2 - \frac{1}{2}\omega_{10}^2 x_1^2 - \frac{1}{2}\omega_{20}^2 x_2^2 - \frac{1}{2}\lambda'_{12} x_1 x_2 - \frac{1}{2}\lambda'_{21} x_2 x_1 \tag{4}$$

From the Euler-Lagrange equation, it follows that:

$$\lambda_{12} = \frac{1}{2}(\lambda'_{12} + \lambda'_{21}) = \lambda_{21}$$

The values $\omega_{10}$, $\omega_{20}$ are eigenfrequencies of the two oscillators and not of the coupled system of the two oscillators. These eigenfrequencies $\omega_{10}$ and $\omega_{20}$ are obtained from solutions of the two harmonic oscillators below:

$$\ddot{x}_1 + \frac{\omega_{10}}{Q_1}\dot{x}_1 + \omega_{10}^2 x_1 = 0 \tag{5a}$$

$$\ddot{x}_2 + \frac{\omega_{20}}{Q_2}\dot{x}_2 + \omega_{20}^2 x_2 = 0 \tag{5b}$$

We now consider harmonic driving forces at the same driving frequency $\omega$ applied to the two oscillators. We can write equations for $F_1$ and $F_2$ as follows:

$$F_1 = \omega_0^2 A_1 e^{i\omega t} \tag{6a}$$

$$F_2 = \omega_0^2 A_2 e^{i\omega t} \tag{6b}$$

The normalized force amplitudes $A_1$ and $A_2$ are complex numbers that have units of $[x_{1,2}]$, and $\omega_0^2$ is defined as $$\omega_0^2 = \frac{\omega_{10}^2 + \omega_{20}^2}{2} \tag{7}$$

Substituting these expressions into Eqs. (1), we obtain the following set of equations for two coupled oscillators:

$$\ddot{x}_1 + \frac{\omega_{10}}{Q_1}\dot{x}_1 + \omega_{10}^2 x_1 = \omega_0^2 A_1 e^{i\omega t} + \omega_0^2 \gamma x_2 \tag{8a}$$

$$\ddot{x}_2 + \frac{\omega_{20}}{Q_2}\dot{x}_2 + \omega_{20}^2 x_2 = \omega_0^2 A_2 e^{i\omega t} + \omega_0^2 \gamma x_1 \tag{8b}$$

wherein the normalized coupling constant γ is defined by the equation:

$$\omega_0^2 \gamma = \lambda_{12} = \lambda_{21} \quad (9)$$

1.2 Solution of the Equations for Coupled Harmonic Oscillators

We seek a solution of the set of Eqs. (8) in the form:

$$x_1 = x_{10} e^{i\omega t} \quad (10a)$$

$$x_2 = x_{20} e^{i\omega t} \quad (10b)$$

wherein $x_{10}$ $x_{20}$ are complex amplitudes of $x_1$, $x_2$ respectively. Substituting Eqs. (10) into Eqs. (8) and dividing by the common factor $e^{i\omega t}$ we get:

$$x_{10} D_1(\omega) - \omega_0^2 \gamma x_{20} = \omega_0^2 A_1 \quad (11a)$$

$$x_{20} D_2(\omega) - \omega_0^2 \gamma x_{10} = \omega_0^2 A_2 \quad (11b)$$

wherein $$D_1(\omega) = \omega_{10}^2 - \omega^2 + i\frac{\omega \omega_{10}}{Q_1} \quad (12a)$$

$$D_2(\omega) = \omega_{20}^2 - \omega^2 + i\frac{\omega \omega_{20}}{Q_2} \quad (12b)$$

The set of Eqs. (8) can be written as a single matrix equation:

$$\begin{pmatrix} D_1(\omega) & -\omega_0^2 \gamma \\ -\omega_0^2 \gamma & D_2(\omega) \end{pmatrix} \begin{pmatrix} x_{10} \\ x_{20} \end{pmatrix} = \begin{pmatrix} \omega_0^2 A_1 \\ \omega_0^2 A_2 \end{pmatrix} \quad (13)$$

or $$Ux = A \quad (14)$$

wherein $$U = \begin{pmatrix} D_1(\omega) & -\omega_0^2 \gamma \\ -\omega_0^2 \gamma & D_2(\omega) \end{pmatrix}, x = \begin{pmatrix} x_{10} \\ x_{20} \end{pmatrix}, A = \omega_0^2 \begin{pmatrix} A_1 \\ A_2 \end{pmatrix} \quad (15)$$

The solution of Eq. (14) is $$x = U^{-1} A \quad (16)$$

or equivalently, $$\begin{pmatrix} x_{10} \\ x_{20} \end{pmatrix} = \frac{\omega_0^2}{\det(U)} \begin{pmatrix} D_2(\omega) & \omega_0^2 \gamma \\ \omega_{10}^2 \gamma_{12} \omega_0^2 \gamma & D_1(\omega) \end{pmatrix} \begin{pmatrix} A_1 \\ A_2 \end{pmatrix} \quad (17)$$

wherein $$\det(U) = D_1(\omega) D_2(\omega) - \omega_0^4 \gamma^2 \quad (18)$$

The solution may be written explicitly as:

$$x_{10} = \frac{\omega_0^2 D_2(\omega) A_1 + \omega_0^4 \gamma A_2}{D_1(\omega) D_2(\omega) - \omega_0^4 \gamma^2} \quad (19a)$$

$$x_{20} = \frac{\omega_0^2 D_1(\omega) A_2 + \omega_0^4 \gamma A_1}{D_1(\omega) D_2(\omega) - \omega_0^4 \gamma^2} \quad (19b)$$

The above equations solve the system of coupled harmonic oscillators expressed by Eqs. (8).

From Eq. (19a) and Eq. (19b), it follows that the ratio of the amplitudes of the two oscillators is $$r = \frac{x_{10}}{x_{20}} = \frac{D_2(\omega) A_1 + \omega_0^2 \gamma A_2}{D_1(\omega) A_2 + \omega_0^2 \gamma A_1} \quad (20)$$

Thus, at any given ω there exists a ratio $A_1/A_2$ that provides the desired ratio r of amplitudes $x_{10}/x_{20}$ at ω. From Eq. (20), it follows that $A_1/A_2$ is $$\frac{A_1}{A_2} = \frac{\omega_0^2 r \gamma - D_1(\omega)}{\omega_0^2 \gamma - r D_2(\omega)} \quad (21)$$

By way of example, for the particular case of two in-phase oscillators at some maximum frequency $\omega_1$ oscillating with the same amplitudes, r=1, and we get from Eq. (21) the ratio of driving force amplitudes that provides this synchronous movement of the oscillators:

$$\frac{A_1}{A_2} = \frac{\omega_0^2 \gamma - D_1}{\omega_0^2 \gamma - D_2} \quad (22)$$

wherein $D_1$ and $D_2$ are computed using Eqs. (12) at frequency $\omega = \omega_1$.

The invention claimed is:

1. A scanning device, comprising:
  a scanner, which comprises:
    a base;
    a gimbal, mounted within the base so as to rotate relative to the base about a first axis; and
    a receive mirror, mounted within the gimbal so as to rotate about a second axis, perpendicular to the first axis;
  a detector, mounted on the gimbal so as to rotate with the gimbal about the first axis and receive light reflected from the receive mirror while the receive mirror rotates about the second axis;
  a collection lens, mounted on the gimbal so as to rotate with the gimbal about the first axis while collecting the light so as to focus the light onto the detector by reflection from the receive mirror while the receive mirror rotates about the second axis; and
  a detector mount, which holds the detector in a position between the collection lens and the receive mirror at a focal point of the collection lens.

2. The device according to claim 1, wherein the scanner comprises a substrate, which is etched to define the base, the gimbal, and the receive mirror in a microelectromechanical systems (MEMS) process.

3. The device according to claim 1, wherein the collection lens focuses the light onto the detector with a numerical aperture greater than 0.5.

4. The device according to claim 1, wherein the collection lens has a first area, and the receive mirror has a second area, which is less than half the first area.

5. The device according to claim 1, wherein the collection lens focuses the collected light at a predefined focal distance, and is mounted at a distance from the receive mirror that is half the focal distance.

6. The device according to claim 1, and comprising:
a stator, which is configured to generate a time-varying magnetic field;
one or more rotors, which are fixed to the gimbal so as to cause the gimbal to rotate in response to the time-varying magnetic field; and
a frame, which is fixed to the rotor and holds the detector and the collection lens.

7. The device according to claim 1, wherein the scanner comprises a transmit mirror, which is mounted within the gimbal so as to rotate about a third axis, parallel to the second axis, in synchronization with the receive mirror, and
wherein the device comprises a transmitter, which is mounted on the gimbal so as to rotate with the gimbal about the first axis and to transmit a beam of light toward the transmit mirror while the transmit mirror rotates about the third axis so as to scan the beam of light over a scene, whereby the detector receives, via the collection lens and the receive mirror, the light that is reflected from the scene.

8. The device according to claim 7, wherein the beam emitted by the transmitter comprises pulses of light, and wherein the detector is configured to generate an output, in response to the received light, that is indicative of a time of flight of the pulses to and from points in the scene.

9. The device according to claim 7, wherein rotations of the transmit and receive mirrors are synchronized in frequency and phase while the transmit and receive mirrors rotate with different amplitudes.

10. The device according to claim 7, wherein the transmitter comprises an emitter, which is configured to emit the beam of light in a direction parallel to the gimbal, and wherein the device comprises a turning mirror, which is mounted off-axis relative to the first axis and is configured to receive and direct the emitted beam toward the transmit mirror, and wherein the detector is also mounted off-axis relative to the first axis.

11. A scanning device, comprising:
a scanner, which comprises:
a base;
a gimbal, mounted within the base so as to rotate relative to the base about a first axis; and
a receive mirror, mounted within the gimbal so as to rotate about a second axis, perpendicular to the first axis;
a transmit mirror, which is mounted within the gimbal so as to rotate about a third axis, parallel to the second axis, in synchronization with the receive mirror;
a detector, mounted on the gimbal so as to rotate with the gimbal about the first axis and receive light reflected from the receive mirror while the receive mirror rotates about the second axis;
a collection lens, mounted on the gimbal so as to rotate with the gimbal about the first axis while collecting the light so as to focus the light onto the detector by reflection from the receive mirror while the receive mirror rotates about the second axis;
a transmitter, which is mounted on the gimbal so as to rotate with the gimbal about the first axis and to transmit a beam of light toward the transmit mirror while the transmit mirror rotates about the third axis so as to scan the beam of light over a scene, whereby the detector receives, via the collection lens and the receive mirror, the light that is reflected from the scene,
wherein the transmit mirror has a first area, and the receive mirror has a second area, which is at least twice the first area.

12. A method for scanning, comprising:
providing a scanner comprising:
a gimbal mounted within a base so as to rotate relative to the base about a first axis;
a receive mirror mounted within the gimbal so as to rotate about a second axis, perpendicular to the first axis;
a detector mounted on the gimbal so as to rotate with the gimbal about the first axis and receive light reflected from the receive mirror while the receive mirror rotates about the second axis;
a collection lens mounted on the gimbal so as to rotate with the gimbal about the first axis so as to collect and focus the light onto the detector by reflection from the receive mirror while the receive mirror rotates about the second axis;
a transmit mirror mounted within the gimbal so as to rotate about a third axis, parallel to the second axis, in synchronization with the receive mirror; and
a transmitter mounted on the gimbal so as to rotate with the gimbal about the first axis and to transmit a beam of light toward the transmit mirror while the transmit mirror rotates about the third axis so as to scan the beam of light over a scene, whereby the detector receives, via the collection lens and the receive mirror, the light that is reflected from the scene; and
driving the transmit and receive mirrors to rotate in mutual synchronization of frequency and phase but with different amplitudes.

13. The method according to claim 12, wherein mounting the gimbal and the receive mirror comprise etching a substrate to define the base, the gimbal, and the receive mirror in a microelectromechanical systems (MEMS) process.

14. The method according to claim 12, wherein mounting the detector comprises holding the detector in a position between the collection lens and the receive mirror at a focal point of the collection lens.

15. The method according to claim 12, and comprising fixing one or more rotors to the gimbal, and causing the gimbal to rotate by driving a stator to generate a time-varying magnetic field in proximity to the one or more rotors,
wherein mounting the detector comprises fixing a frame to the rotor and fixing the detector and the collection lens to the frame.

16. The method according to claim 12, wherein the beam emitted by the transmitter comprises pulses of light, and wherein the method comprises receiving an output from the detector, in response to the received light, that is indicative of a time of flight of the pulses to and from points in the scene.

17. The method according to claim 12, wherein mounting the transmitter comprises mounting an emitter to emit the beam of light in a direction parallel to the gimbal, and wherein the method comprises mounting a turning mirror off-axis relative to the first axis so as to receive and direct the emitted beam toward the transmit mirror, and wherein the detector is also mounted off-axis relative to the first axis.

\* \* \* \* \*